United States Patent
Yagi et al.

(10) Patent No.: US 8,024,939 B2
(45) Date of Patent: Sep. 27, 2011

(54) OUTDOOR UNIT OF AIR CONDITIONER AND ITS CONTROL METHOD

(75) Inventors: Satoshi Yagi, Osaka (JP); Hisashi Sumida, Osaka (JP); Hirotaka Saruwatari, Osaka (JP); Hiroyuki Matsuura, Osaka (JP); Mario Hayashi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 500 days.

(21) Appl. No.: 12/223,320

(22) PCT Filed: Feb. 1, 2007

(86) PCT No.: PCT/JP2007/051694
§ 371 (c)(1),
(2), (4) Date: Jul. 29, 2008

(87) PCT Pub. No.: WO2007/088928
PCT Pub. Date: Aug. 9, 2007

(65) Prior Publication Data
US 2009/0038325 A1 Feb. 12, 2009

(30) Foreign Application Priority Data
Feb. 2, 2006 (JP) ................................. 2006-025672
Aug. 18, 2006 (JP) ................................. 2006-223284

(51) Int. Cl.
*F25D 23/12* (2006.01)
*G06F 11/00* (2006.01)

(52) U.S. Cl. ........................ 62/259.1; 714/4.1; 714/23

(58) Field of Classification Search ................. 62/259.1; 700/3, 275, 276; 714/4, 10, 23, 4.1; 235/492
See application file for complete search history.

(56) References Cited

U.S. PATENT DOCUMENTS
2006/0151614 A1 * 7/2006 Nishizawa et al. ........... 235/492

FOREIGN PATENT DOCUMENTS

| JP | 57067741 A | * | 4/1982 |
|---|---|---|---|
| JP | 5-4220 U | | 1/1993 |
| JP | 8-86499 A | | 4/1996 |
| JP | 9-282002 A | | 10/1997 |
| JP | 09282002 A | * | 10/1997 |
| JP | 2000-28187 A | | 1/2000 |
| JP | 2000-335047 A | | 12/2000 |
| JP | 2000-346425 A | | 12/2000 |
| JP | 2002-262452 A | | 9/2002 |
| JP | 2002-295883 A | | 10/2002 |
| JP | 2004-132669 A | | 4/2004 |
| WO | WO 2005004047 A1 | * | 1/2005 |

* cited by examiner

*Primary Examiner* — Chen Wen Jiang
(74) *Attorney, Agent, or Firm* — Birch, Stewart, Kolasch & Birch, LLP.

(57) ABSTRACT

An outdoor unit includes an outdoor unit control circuit, an inverter substrate and a compressor. Periodic communication showing the operating condition of the inverter substrate is set from the inverter substrate to the outdoor unit control circuit. Thus, when the communication is performed normally, the drive of the compressor is changed to a power saving process according to the necessity of the power consumption and the operating condition of the inverter substrate. When the communication is defective, the power-on reset is done to the inverter substrate.

20 Claims, 6 Drawing Sheets

OUTDOOR UNIT OF AIR CONDITIONER AND ITS CONTROL METHOD

TECHNICAL FIELD

The present invention relates to a method for controlling an outdoor unit of an air conditioner.

BACKGROUND ART

When it is determined that a defect is generated in an actuator such as a compressor, a fan, an evaporation valve, a four-way switch valve or a crank case heater in an outdoor unit of an air conditioner, that fact is reported. Conventionally, an operator recognizes that defect report and manually restarts the operation. In addition, a technique in which actuators are checked periodically by a hardware generally called a watchdog timer is proposed. However, the manual restart poses a task for the operator, and a new hardware is required for adopting the watchdog timer.

In addition, the following documents relate to the present invention.

Patent Document 1: Japanese Patent Application Laid-Open No. 2000-346425
Patent Document 2: Japanese Patent Application Laid-Open No. 2000-335047
Patent Document 3: Japanese Patent Application Laid-Open No. 2002-262452

DISCLOSURE OF THE INVENTION

The present invention was made in view of the above problems and it is an object of the present invention to provide a technique to restart an actuator of an outdoor unit when a defect is generated therein without adding a new hardware and bothering an operator.

First to fifth aspects of the present invention provides a control method of an outdoor unit (41, 42, 43) including an actuator (413, 423, 433), a drive circuit (412, 422, 432) for conducting drive the actuator, and a control circuit (411, 421, 431) for controlling the drive circuit.

According to the first aspect, communication showing the operating condition of the drive circuit is set from the drive circuit to the control circuit (1), and when it is determined that the communication is defective (4), the operation of the drive circuit is reset (105 to 112).

Preferably, the communication is set so as to be performed periodically in the first aspect, and based on the communication is not performed (2) or on its contents are defective (3), it is determined that the communication is defective. Still preferably, when the communication is performed normally, a power saving process (20) for changing the drive based on the necessity of the power consumption and the operating condition.

Preferably, when the control circuit does not receive a normal signal in a predetermined period after received a defective signal, it is determined that the communication is defective in the first aspect.

According to the second aspect, in the first aspect, the resetting is performed by stopping a power supply (105) to the drive circuit (412, 422, 432) and restarting the power supply afterward (109).

According to the third aspect, in the first and second aspects, the communication is tried after the resetting (109), and only when the communication is performed normally (111), the drive is started (112).

Preferably, in the third aspect, determination whether the communication is not normally performed after the resetting is made by determining whether the communication is defective a plurality of times (111, 121).

According to the fourth aspect, in the third aspect, a plurality of outdoor units are provided, and when the first outdoor unit is suspended (103), and the operation of the drive circuit is reset in the second outdoor unit (105 to 112), the first outdoor unit is started (104) before the resetting is performed.

According to the fifth aspect, in the first to fourth aspects, when the communication is not performed (2) or their contents are defective (3) (4), in all the outdoor units (41, 42, 43), an indoor unit constituting the air conditioner is stopped with the outdoor units (106).

According to a sixth aspect, in the first to fifth aspects, the drive circuit (412) includes an inverter circuit (4122) for supplying an operation power supply to the actuator (413, 423, 433), and an actuator control circuit (4121) communicating with the control circuit (411) to control the operation of the actuator through the inverter circuit, and power supply to the drive circuit is stopped (105) by stopping power supply to the actuator control circuit, while power supply to the inverter circuit is continued.

The present invention includes an outdoor unit of an air conditioner, including an actuator (413, 423, 433) a drive circuit (412, 422, 432) for driving the actuator and a control circuit (411, 421, 431) for controlling the drive circuit, and controlled by the above-described control method according to the present invention.

According to the first aspect of the control method of the outdoor unit in the present invention, under the condition that the operating condition of the drive circuit is transmitted to the control circuit, the power saving process or the drive circuit resetting is respectively performed based on whether the transmission is normal or not. Thus managed, the drive circuit is recovered from its temporal malfunction such as microcomputer runaway or latch-up generation. In addition, since the periodic communication to perform the power saving process is used, it is not necessary to add a new hardware.

According to the second aspect of the control method of the outdoor unit in the present invention, the operation of the drive circuit is reset by so-called power-on reset.

According to the third aspect of the control method of the outdoor unit in the present invention, the drive circuit that cannot be operated normally even after the resetting is inhibited from driving the actuator, to prevent the microcomputer runaway and the recurrence of the latch-up.

In the outdoor unit having the drive circuit operating abnormally, it is likely that its ability is not exercised normally. Thus, according to the fourth aspect of the control method of the outdoor unit in the present invention, when the drive circuit cannot be restarted, the outdoor unit to compensate the reduced ability of the all outdoor units is previously prepared.

According to the fifth aspect of the control method of the outdoor unit in the the present invention, when it is determined that the outdoor unit that is only provided in the air conditioner, or the outdoor units that are provided in the air conditioner, are defective, the operation of the indoor units are stopped to prepare for another maintenance.

According to the sixth aspect of the control method of the outdoor unit in the present invention, the power supply to the actuator control circuit that is performing the communication is stopped when the communication defect is detected, while the power supply to the inverter circuit is continued.

The purpose, characteristics, situation and advantage of the present invention become apparent through the following detailed description and appended drawings.

BEST MODE FOR CARRYING OUT THE INVENTION

Figure 1:
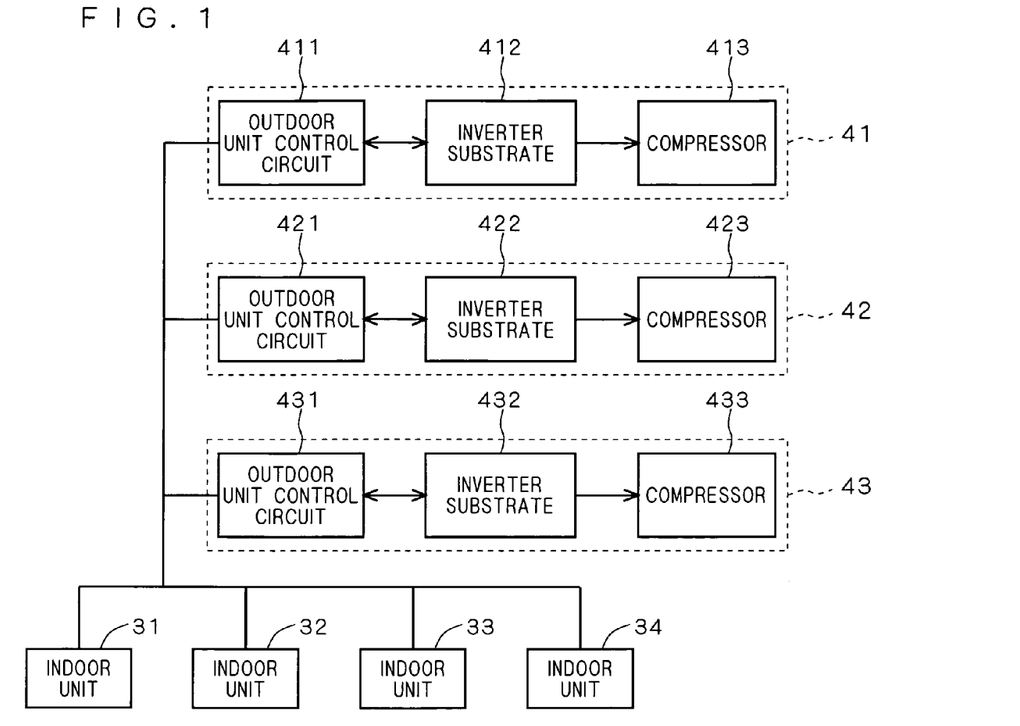
FIG. 1 is a block diagram showing a constitution of an air conditioner to which a control method according to the present invention is applied.

FIG. 1 is a block diagram showing a constitution of an air conditioner to which a control method according to the present invention is applied. Indoor units 31 to 34 and outdoor units 41 to 43 are connected so that they can communicate with each other. The indoor units 31 to 34 carry out the predetermined air conditioning through thermal exchange with a cooling medium cooled by the outdoor units 41 to 43.

The outdoor unit 41 includes an outdoor unit control circuit 411, an inverter substrate 412 and a compressor 413. The compressor 413 is a kind of actuator, and the inverter substrate 412 functions as a drive circuit for driving the compressor 413. In addition, the outdoor unit control circuit 411 functions as a control circuit for controlling the inverter substrate 412.

Periodic communication showing the operating condition of the inverter substrate 412 is set from the inverter substrate 412 to the outdoor unit control circuit 411. Thus, when the communication is performed normally, the drive of the compressor 413 is changed as a power saving process based on the necessity of the power consumption and the operating condition of the inverter substrate 412.

Figure 2:
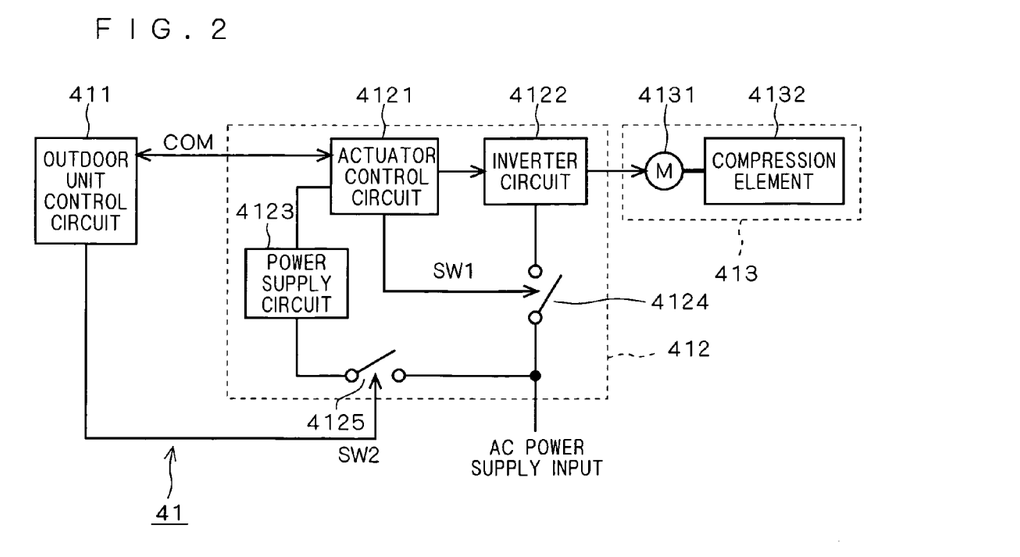
FIG. 2 is a block diagram showing the detail of an outdoor unit.

FIG. 2 is a block diagram showing the outdoor unit 41 in detail. The inverter substrate 412 has an actuator control circuit 4121, an inverter circuit 4122, a power supply circuit 4123, and switches 4124 and 4125. The compressor 413 has a compression element 4132 for compressing the cooling medium and a motor 4131 for driving the compression element 4132.

The inverter circuit 4122 receives electricity from an AC power supply input through the switch 4124 to control the rotation drive of the motor 4131.

The actuator control circuit 4121 issues a switching command to the inverter circuit 4122 as one control operation. That is, the actuator control circuit 4121 controls the operation of the actuator through the inverter circuit 4122. The operation power of the actuator control circuit 4121 is supplied from the power supply circuit 4123. The power supply circuit 4123 receives electricity from the AC power supply input through the switch 4125 and converts it to an appropriate voltage and outputs it to the actuator control circuit 4121.

In addition, the communication COM between the actuator control circuit 4121 and the outdoor unit control circuit 411 is performed, and the above-described periodic communication is included in the communication COM.

The other outdoor units 42 and 43 include the same constitution as shown in FIG. 2. Corresponding to the control circuit 411, the inverter substrate 412 and the compressor 413, the outdoor unit 42 includes a control circuit 421, an inverter substrate 422 and a compressor 423, and the outdoor unit 43 includes a control circuit 431, an inverter substrate 432 and a compressor 433.

In addition, the outdoor unit control circuits 411, 421 and 431 communicate with each other to determine whether each of them is a master or a slave.

Figure 3:
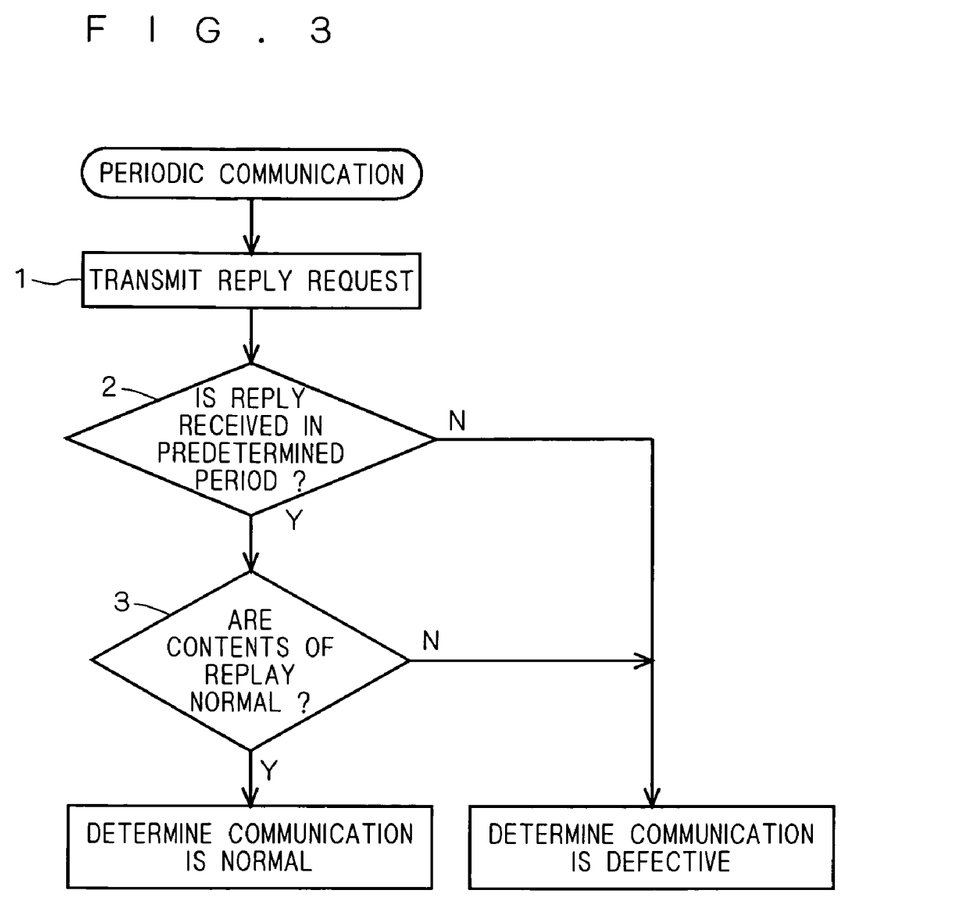
FIG. 3 is a flowchart to determine whether periodic communication is normal or not.

FIG. 3 is a flowchart for determining whether the above periodic communication is normal or defective in the outdoor unit control circuits 411, 421 and 431. In step 1, the outdoor unit control circuits 411, 421 and 431 transmit reply requests to the inverter substrates 412, 422 and 432, respectively. The reply request may not request the reply only, and the inverter substrates 412, 422 and 432 may operate transmission to the outdoor unit control circuits 411, 421 and 431, receiving the reply request as a trigger.

In step 2, when it is determined that the inverter substrates 412, 422 and 432 do not reply in a predetermined period, it is determined that there is a communication defect.

When it is determined that the reply has been received in the predetermined period in step 2, the process proceeds to step 3. At the step 3, it is determined whether the contents of the reply are normal or not. Thus, communication normal or communication defect is respectively determined based on whether the contents are the normal or defective.

Therefore, when there is no periodic communication, or when the contents are defective, it is determined that the communication is defective.

Figure 4:
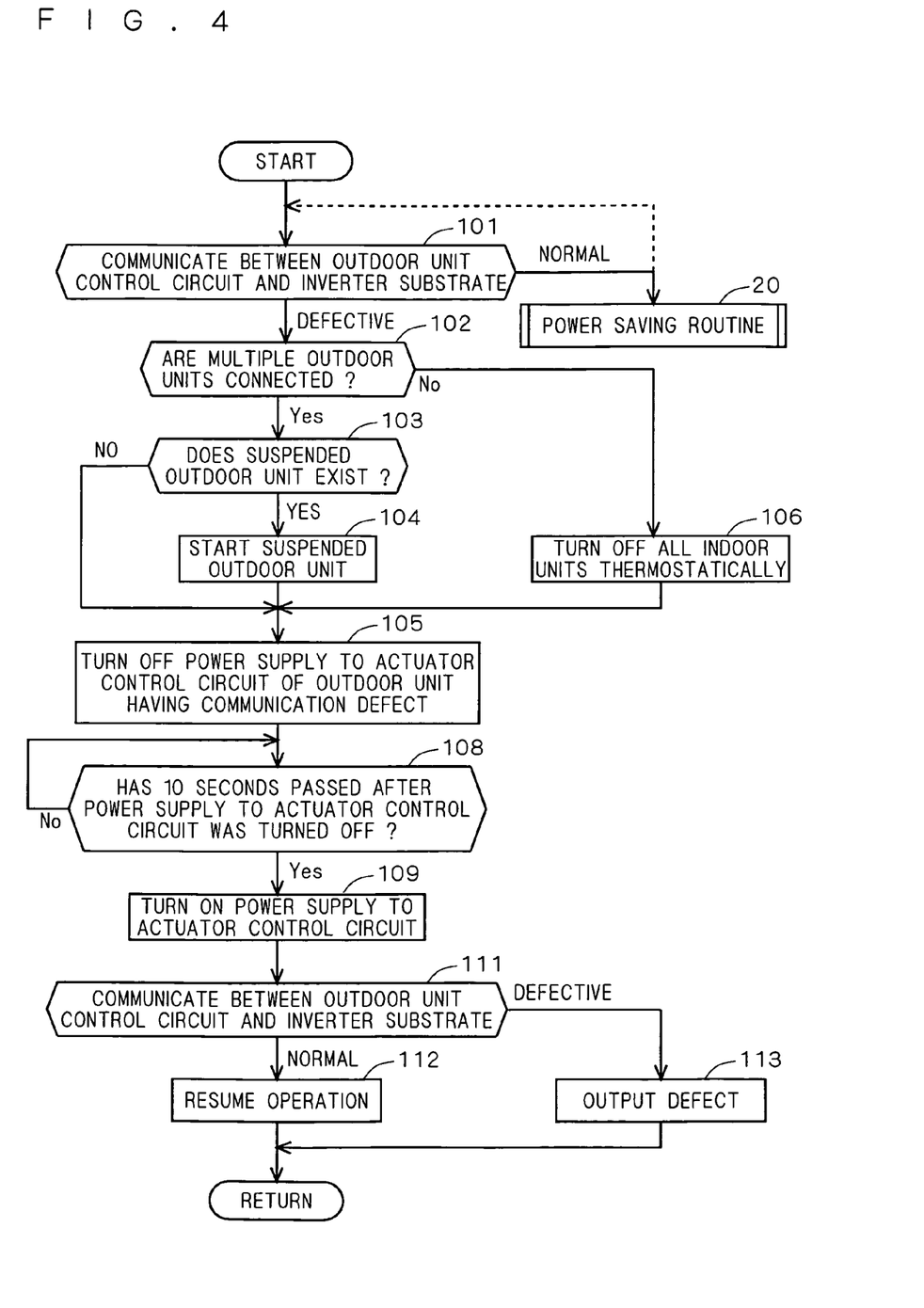
FIG. 4 is a flowchart showing a process performed when the communication is defective.

FIG. 4 is a flowchart showing a process to be performed mainly when the communication defect is generated. In step 101, it is determined whether the communication between the outdoor unit control circuit and the inverter substrate is normal or defective. In this determination, the flowchart shown in FIG. 3 can be used. That is, when the determinations in steps 2 and 3 are negative, since the communication defect is determined, the process proceeds to step 102. Meanwhile, when the communication normal is determined in step 3, a power saving routine 20 is executed.

The power saving routine 20 is a known technique. For example, referring to FIG. 2, when the power consumption is requested and when the operation of the inverter substrate 412 hardly drives the compressor 413, a change is made such that the compressor 413 is stopped. For example, the outdoor unit control circuit 411 makes the actuator control circuit 4121 output a switching command SW1 to cut the switch 4124. When the switch 4124 is cut, the power supply is not applied to the inverter circuit 4122, so that the power consumption is reduced. In addition, the process does not always move to the power saving routine 20 and step 101 may be performed repeatedly as shown by a broken line in FIG. 4.

After the step 102, the operation of the inverter substrate 412 and especially the actuator control circuit 4121 is reset. Thus, the temporal functional defect of the actuator control circuit 4121 such as microcomputer runaway and latch-up generation can be managed for recovery. At this time, labor of an operator is not necessary. In addition, since the periodic communication to operate the power saving routine 20 is used, a new hardware is not needed also.

It is determined whether the plurality of outdoor units are connected or not in step 102. For example, multiple connection of the plurality of outdoor units is included. Here, the multiple connection of the outdoor units means that the air conditioning of the indoor unit connected to the outdoor units in common is implemented by the compression operations of the cooling media in the outdoor units.

In the case where the plurality of outdoor units are not connected, that is, in the case where any one of the outdoor units 41, 42 and 43 is provided only, when the communication defect is generated, all the indoor units 31 to 34 are stopped so-called thermo-off for example, in step 106. Thus, the operation of the indoor unit is stopped to prepare for another maintenance. In addition, when only the outdoor unit 41 is connected to the indoor units 31 to 34, the outdoor unit 41 becomes the master and can recognize that there is no slave outdoor unit.

In step 102, when it is determined that the plurality of outdoor units are connected, the processes at the steps 103 and 104 are performed and a step 105 is also executed. The processes at the steps 103 and 104 will be described below.

A description will be made of the case where the communication defect is generated in the periodic communication in the outdoor unit 41 and the periodic communication of the outdoor units 42 and 43 are normal hereinafter. In communication defect step 105, the power supply to the actuator control circuit 4121 of the outdoor unit 41 having the communication defect is turned off. More specifically, referring to FIG. 2, the outdoor unit control circuit 411 outputs a switching command SW2 to cut the switch 4125. When the switch 4125 is cut, the power supply is not applied to the actuator control circuit 4121.

After the actuator control circuit 4121 is turned off, it is on standby for a predetermined time, 10 seconds in step 108, for example. Then, in step 109, the power supply to the actuator control circuit 4121 is started again. More specifically, referring to FIG. 2, the outdoor unit control circuit 411 outputs the switching command SW2 to connect the switch 4125.

According to the so-called power-on reset, the operation of the actuator control circuit 4121 and accordingly the operation of the inverter substrate 412 is reset. Here, it is to be noted that it is not necessary to cut the switch 4124 in this power-on reset. Because, the power-on reset is performed based on the communication defect between the outdoor unit control circuit 411 and the actuator control circuit 4121 and it is enough to reset the operation of the actuator control circuit 4121.

When step 109 is executed, the above-described periodic communication is started again. Then, in step 111, it is determined whether the communication is normal or defective again. The flowchart shown in FIG. 3 can be used in step 111 also. Thus, when the communication defect is still detected, the process proceeds to step 113. In step 113, similar to the conventional example, the fact that the defect is generated is reported to prepare for another maintenance such as manual restart by the operator according to need.

When it is determined that the periodic communication is normal in step 111, the operation of the actuator control circuit 4121 and accordingly the operation of the inverter substrate 412 are restarted. More specifically, the compressor 413 is restarted.

Steps 103 and 104 are preferably performed when the plurality of outdoor units are connected. When the plurality of outdoor units are connected, there is a suspended outdoor unit according to a required ability in some cases. In this case, the process proceeds to the step 104 to start the suspended outdoor unit.

It is likely that the outdoor unit 41 having the defective inverter substrate 412 does not exercise its ability normally. Thus, when the inverter substrate 412 cannot be restarted, the outdoor unit to be operated is previously prepared before the operation of the inverter substrate 412 is reset, in order to compensate the reduced ability of the whole outdoor units.

For example, when the outdoor unit 42 is suspended, the outdoor unit 42 is started. Since the outdoor units 41, 42 and 43 recognize mutual operating condition through the communication between the outdoor unit control circuits 411, 421 and 431, the suspended outdoor unit 42 can be started by the outdoor unit 41.

In addition, when the communication defect is generated in all of the outdoor units 41, 42 and 43 also, it is preferable to perform step 106 to stop the operation of the indoor units to prepare for another maintenance.

It is not always required to use the periodic communication shown in FIG. 3 in order to determine whether the communication between the outdoor unit control circuit 411 and the inverter substrate 412 is defective or not in steps 101 and 111.

Figure 5:
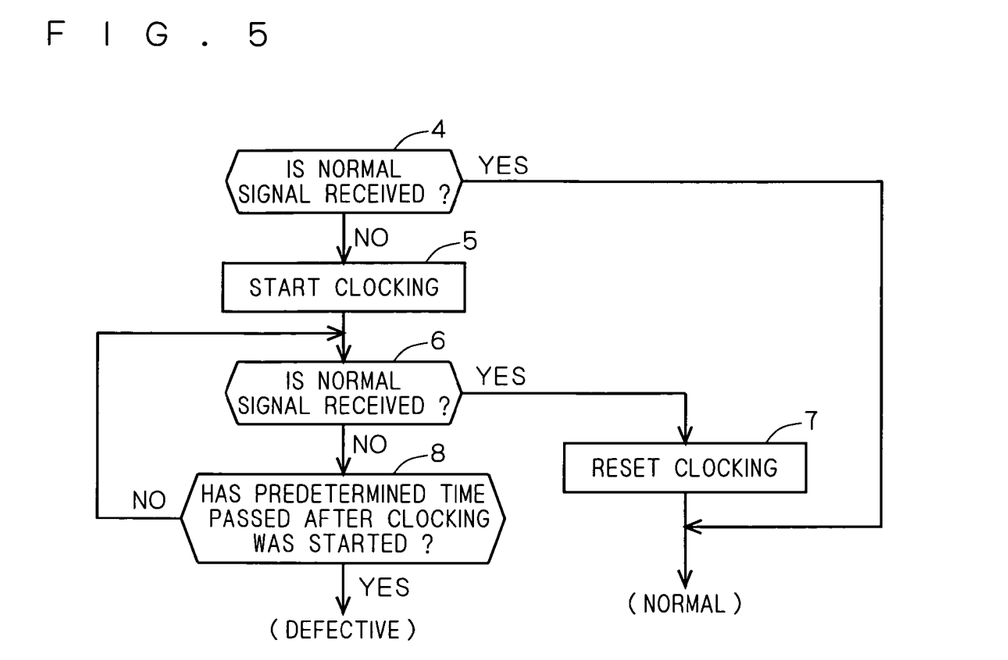
FIG. 5 is a flowchart showing other steps to determine whether a communication defect exists or not.

FIG. 5 is a flowchart showing other steps to determine whether the communication is defective or not, which is used in steps 101 and 111. In step 4, it is determined whether the outdoor unit control circuits 411, 421 and 431 receive normal signals from the inverter substrates 412, 422 and 432 or not, respectively. In step 5, a clocking is started. This counting may be implemented by counting a clock signal used in the outdoor unit control circuits 411, 421 and 431 in general.

Thus, in step 6, it is determined again whether the outdoor unit control circuits 411, 421 and 431 receive the normal signals from the inverter substrates 412, 422 and 432 or not, respectively. When the normal signals are not received, the process proceeds to step 8, and it is determined whether a predetermined time has passed from the start of the clocking or not. When it is determined that the predetermined time has passed, since the predetermined time has passed while the normal signal is not received, it is determined that the communication is defective. In this case, when the flowchart shown in FIG. 5 is employed in steps 101 and 111 shown in FIG. 4, the processes proceed from step 8 to steps 102 and 113, respectively.

When the predetermined time has not passed from the clocking start in step 5 although the outdoor unit control circuits 411, 421 and 431 do not receive the normal signal from the inverter substrates 412, 422 and 432, the process returns to step 6 and it is still determined whether the normal signal is received or not. Thus, when it is determined that the normal signal is received in step 6, the process proceeds to step 7, in which the clocking is reset and it is determined that the communication is normal (there is no communication defect). This is the same as the case where the normal signal is received in step 4. In this case, when the flowchart shown in FIG. 5 is employed in steps 101 and 111 shown in FIG. 4, the process proceeds to the power saving routine 20 and to step 112, respectively.

For example, the predetermined period in step 8 is 30 seconds and 10 seconds in steps 101 and 111, respectively.

Figure 6:
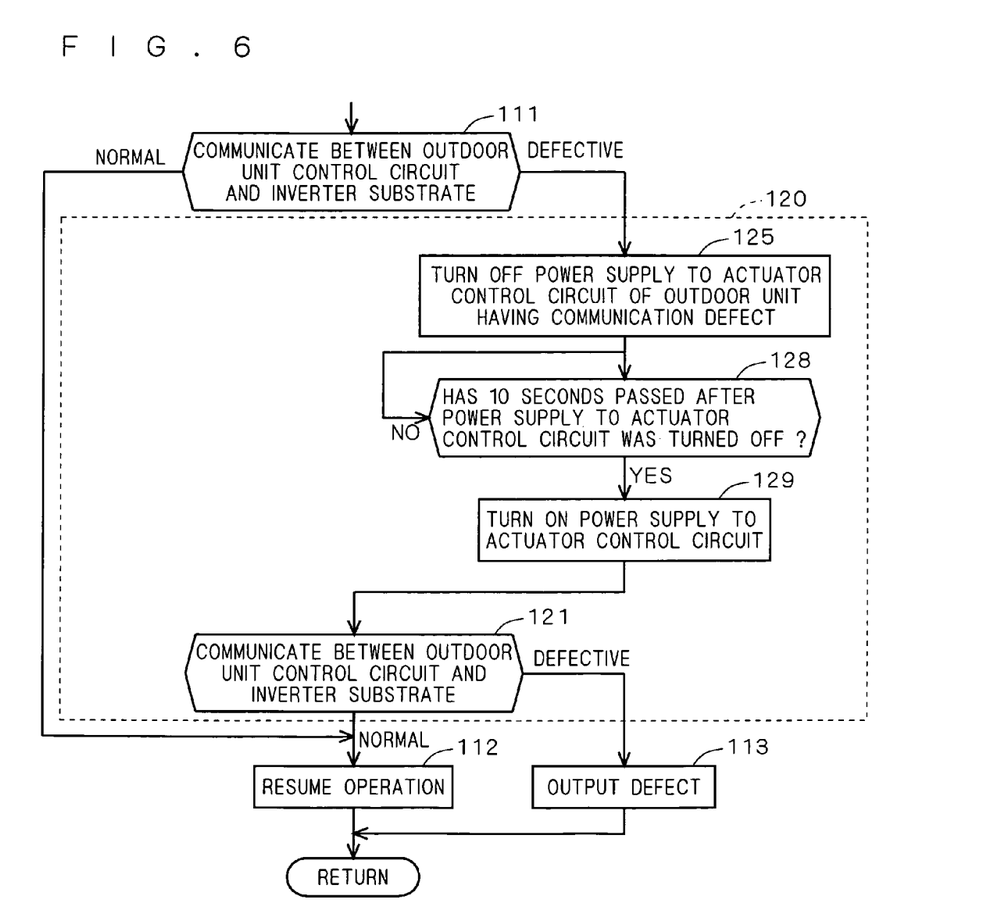
FIG. 6 is a flowchart used in a variation of the present invention.

After the power-on reset is performed in the processes in steps 105 to 109, the power-on reset may be performed while the process is moved from step 111 to step 113. FIG. 6 is a flowchart used in the above said variation. Although only steps between step 111, and the steps 112 and 113 are shown in the flowchart, the other steps can use the same flowchart as shown in FIG. 4.

When it is determined that the communication defect is generated in step 111, step 120 is performed before the process proceeds to step 113. Step 120 includes almost the same steps 125, 128, 129 and 121 as the steps 105, 108, 109 and 111. That is, when it is determined that the communication defect is generated in step 111, the process proceeds to step 125 and the switch 4125 is cut similar to the step 105. Then, it is on standby for a predetermined time, for example 10 seconds in step 128. Then, the switch 4125 is connected again similar to the step 109.

Then, the process proceeds to step 121 and similar to the step 111, it is determined whether the communication defect is generated or not again. When the flowchart shown in FIG. 5 is employed as the steps 101 and 111, the flowchart shown in FIG. 5 can be also employed in step 121. In this case, the predetermined time in step 8 used in step 121 is 10 seconds, for example.

Figure 7:
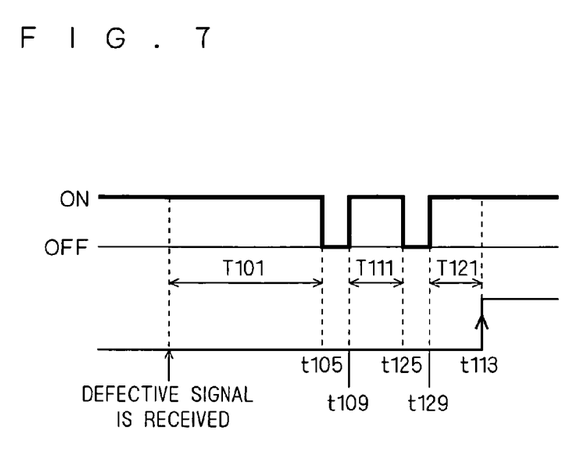
FIG. 7 is a timing chart in the variation of the present invention.

FIG. 7 is a timing chart when the flowchart shown in FIG. 5 is employed in all the steps 101, 111 and 121. Here, the case where the normal signal is not received after a defective signal is received once is illustrated.

After the defective signal is received and a predetermined time T101 is passed in step 8 used in step 101, step 105 is executed at a time t105, and the switch 4125 of the defective outdoor unit is cut. After a time lag due to the execution of step 108, the step 109 is executed at a time t109 and the switch 4125 is connected. Then, after a predetermined period T111 has passed in step 8 used in step 111, step 125 is executed at a time t125, and the switch 4125 of the outdoor unit in which the communication defect is generated is cut. After a time lag due to the execution of the step 128, step 129 is executed at a time t129 and the switch 4125 is connected. Then, after a predetermined period T121 has passed in step 8 used in step 121, in step 113 is executed at a time t113, and the defect output is generated. More specifically, the fact that the defect is generated is reported.

Although the compressor is described as the actuator in the above embodiment, an actuator that is provided in the outdoor unit in general such as a fan, an evaporation valve, a four-way switch valve or a crank case heater may be used. In this case, according to the actuator, a corresponding actuator driver is controlled by an actuator control circuit. In this case also, taking the outdoor unit 41 as an example, by resetting the operation of the actuator control circuit, the operation of the inverter substrate 412 can be reset.

Figure 8:
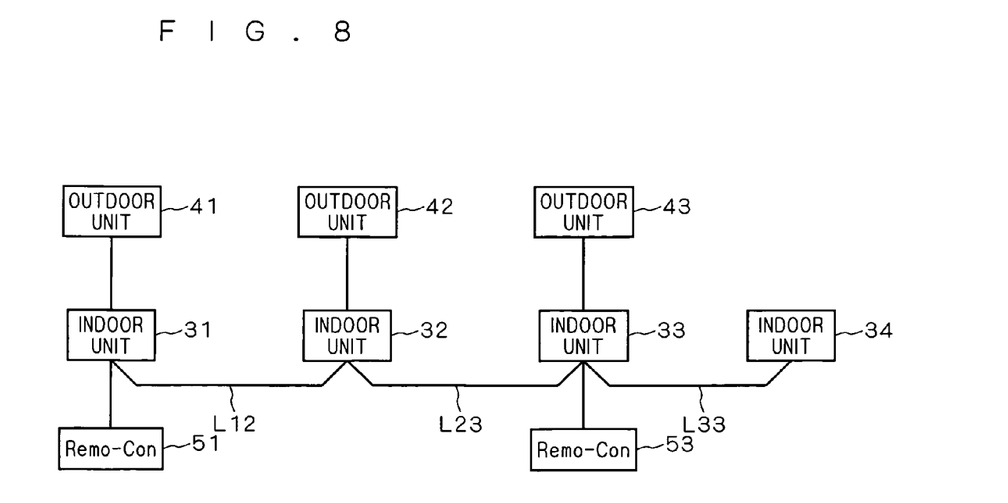
FIG. 8 is a block diagram showing a constitution of an air conditioner having another connection relation.

In addition, the connection between the outdoor unit and the indoor unit is not limited to the multiple connection of the outdoor units shown in FIG. 1. FIG. 8 is a block diagram showing the constitution of an air conditioner having another connection relation. Air conditioning is performed by groups of an outdoor unit 41 and an indoor unit 31, an outdoor unit 42 and an indoor unit 32, and an outdoor unit 43 and indoor units 33 and 34, respectively. Although the communication between the outdoor units 41, 42 and 43 is not directly performed, the communication between the indoor units 31, 32 and 33 is performed. The indoor unit 34 can communicate with the indoor unit 33.

For example, remote controllers (abbreviated to Remo-Con in FIG. 8) 51 and 53 are provided in the indoor units 31 and 33. Thus, the operation command and the operating condition of the indoor units 31 to 34 and the outdoor units 41 to 43 are grasped by the remote controllers 51 and 53. The present invention is applicable to this constitution. For example, when it is determined whether the suspended outdoor unit exists or not in step 103 in the flowchart shown in FIG. 4, the remote controllers 51 and 53 can grasp each other the operating conditions of the outdoor units 41, 42 and 43 by the communication performed between the indoor units 31, 32 and 33. The outdoor unit control circuit 411 shown in FIG. 2 can grasp the operating conditions of the other outdoor units 42 and 43 from the mutual communication with the remote controller 51.

Although the present invention has been described in detail, the above description is only an example in all aspects and the present invention is not limited to this. Various kinds of variations may be added to the illustrated embodiments within the same or equal scope of the present invention.

The invention claimed is:

1. A control method of an outdoor unit in an air conditioner, said outdoor unit comprising:
    an actuator;
    a drive circuit for conducting drive said actuator; and
    a control circuit for controlling said drive circuit, wherein communication showing the operating condition of said drive circuit is set from said drive circuit to said control circuit, said method comprising:
    resetting an operation of said drive circuit when it is determined that said communication is defective,
    wherein
    said communication is tried after said resetting, and only when the communication is performed normally, said drive is started.

2. The control method of the outdoor unit in the air conditioner according to claim 1, wherein
    said communication is set so as to be performed periodically, and
    it is determined that the communication is defective based on said communication is not performed or on its contents are defective.

3. The control method of the outdoor unit in the air conditioner according to claim 2, wherein
    when said communication is performed normally, a power saving process for changing said drive based on the necessity of the power consumption and said operating condition.

4. The control method of the outdoor unit in the air conditioner according to claim 2, wherein
    when said communication is not performed or their contents are defective, in all said outdoor units, an indoor unit constituting said air conditioner is stopped with said outdoor units.

5. The control method of the outdoor unit in the air conditioner according to claim 2, wherein
    said drive circuit comprises:
    an inverter circuit for supplying an operation power supply to said actuator; and
    an actuator control circuit communicating with said control circuit to control the operation of said actuator through said inverter circuit, wherein
    power supply to said drive circuit is stopped by stopping power supply to said actuator control circuit, while power supply to said inverter circuit is continued.

6. The control method of the outdoor unit in the air conditioner according to claim 1, wherein
    when said control circuit does not receive a normal signal in a predetermined period after received a defective signal, it is determined that said communication is defective.

7. The control method of the outdoor unit in the air conditioner according to claim 6, wherein
    when said communication is not performed or their contents are defective, in all said outdoor units, an indoor unit constituting said air conditioner is stopped with said outdoor units.

8. The control method of the outdoor unit in the air conditioner according to claim 6, wherein
    said drive circuit comprises:
    an inverter circuit for supplying an operation power supply to said actuator; and an actuator control circuit communicating with said control circuit to control the operation of said actuator through said inverter circuit, wherein power supply to said drive circuit is stopped by stopping power supply to said actuator control circuit, while power supply to said inverter circuit is continued.

9. The control method of the outdoor unit in the air conditioner according to claim 1, wherein said resetting is performed by stopping a power supply to said drive circuit and restarting said power supply afterward.

10. The control method of the outdoor unit in the air conditioner according to claim 9, wherein when said communication is not performed or their contents are defective, in all said outdoor units, an indoor unit constituting said air conditioner is stopped with said outdoor units.

11. The control method of the outdoor unit in the air conditioner according to claim 9, wherein said drive circuit comprises:

an inverter circuit for supplying an operation power supply to said actuator; and an actuator control circuit communicating with said control circuit to control the operation of said actuator through said inverter circuit, wherein power supply to said drive circuit is stopped by stopping power supply to said actuator control circuit, while power supply to said inverter circuit is continued.

12. The control method of the outdoor unit in the air conditioner according to claim 1, wherein determination whether said communication is not normally performed after said resetting is made by determining whether said communication is defective a plurality of times.

13. The control method of the outdoor unit in the air conditioner according to claim 1, wherein a plurality of said outdoor units are provided, and when said first outdoor unit is suspended, and the operation of said drive circuit is reset in said second outdoor unit, said first outdoor unit is started before the resetting is performed.

14. The control method of the outdoor unit in the air conditioner according to claim 1, wherein when said communication is not performed or their contents are defective, in all said outdoor units, an indoor unit constituting said air conditioner is stopped with said outdoor units.

15. The control method of the outdoor unit in the air conditioner according to claim 1, wherein said drive circuit comprises:

an inverter circuit for supplying an operation power supply to said actuator; and an actuator control circuit communicating with said control circuit to control the operation of said actuator through said inverter circuit, wherein power supply to said drive circuit is stopped by stopping power supply to said actuator control circuit, while power supply to said inverter circuit is continued.

16. An outdoor unit in an air conditioner comprising:

an actuator a drive circuit for driving said actuator; and a control circuit for controlling said drive circuit, wherein said outdoor unit is controlled by the control method of the outdoor unit in the air conditioner according to claim 1.

17. A control method of an outdoor unit in an air conditioner, said outdoor unit comprising:

an actuator;

a drive circuit for conducting drive said actuator; and a control circuit for controlling said drive circuit, wherein communication showing the operating condition of said drive circuit is set from said drive circuit to said control circuit, said method comprising:

resetting an operation of said drive circuit when it is determined that said communication is defective, wherein said drive circuit comprises:

an inverter circuit for supplying an operation power supply to said actuator; and an actuator control circuit communicating with said control circuit to control the operation of said actuator through said inverter circuit, wherein power supply to said drive circuit is stopped by stopping power supply to said actuator control circuit, while power supply to said inverter circuit is continued.

18. The control method of the outdoor unit in the air conditioner according to claim 17, wherein when said communication is not performed or their contents are defective, in all said outdoor units, an indoor unit constituting said air conditioner is stopped with said outdoor units.

19. The control method of the outdoor unit in the air conditioner according to claim 17, wherein said communication is set so as to be performed periodically, and it is determined that the communication is defective based on said communication is not performed or on its contents are defective.

20. A control method of an outdoor unit in an air conditioner, said outdoor unit comprising:

an actuator;

a drive circuit for conducting drive said actuator; and a control circuit for controlling said drive circuit, wherein communication showing the operating condition of said drive circuit is set from said drive circuit to said control circuit, said method comprising:

resetting an operation of said drive circuit when it is determined that said communication is defective, wherein when said control circuit does not receive a normal signal in a predetermined period after received a defective signal, it is determined that said communication is defective, when said communication is not performed or their contents are defective, in all said outdoor units, an indoor unit constituting said air conditioner is stopped with said outdoor units, and said drive circuit comprises:

an inverter circuit for supplying an operation power supply to said actuator; and an actuator control circuit communicating with said control circuit to control the operation of said actuator through said inverter circuit, wherein power supply to said drive circuit is stopped by stopping power supply to said actuator control circuit while power supply to said inverter circuit is continued.

* * * * *